United States Patent
Chiu

(10) Patent No.: US 9,552,456 B2
(45) Date of Patent: Jan. 24, 2017

(54) METHODS AND APPARATUS FOR PROBING SIGNALS FROM A CIRCUIT AFTER REGISTER RETIMING

(71) Applicant: Altera Corporation, San Jose, CA (US)

(72) Inventor: Gordon Raymond Chiu, North York (CA)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/726,237

(22) Filed: May 29, 2015

(65) Prior Publication Data

US 2016/0350468 A1 Dec. 1, 2016

(51) Int. Cl.
G06F 17/50 (2006.01)

(52) U.S. Cl.
CPC ....... *G06F 17/5081* (2013.01); *G06F 17/5031* (2013.01); *G06F 17/5077* (2013.01)

(58) Field of Classification Search
CPC .............. G06F 17/5081; G06F 17/5077; G06F 17/5031
See application file for complete search history.

(56) References Cited

U.S. PATENT DOCUMENTS

| | | | | |
|---|---|---|---|---|
| 5,448,497 A * | 9/1995 | Ashar | ................. | G06F 17/5045 716/108 |
| 6,941,541 B2 * | 9/2005 | Snider | ................. | G06F 17/5045 716/103 |
| 7,020,397 B2 | 3/2006 | Lemoff et al. | | |
| 7,093,204 B2 * | 8/2006 | Oktem | ................. | G06F 17/505 716/103 |
| 7,120,883 B1 * | 10/2006 | van Antwerpen | .. | G06F 17/5054 716/102 |
| 7,224,181 B1 | 5/2007 | Schmit et al. | | |
| 7,600,211 B1 | 10/2009 | Goldberg et al. | | |
| 7,893,724 B2 | 2/2011 | Moyal et al. | | |
| 7,945,880 B1 * | 5/2011 | Albrecht | ............. | G06F 17/5031 716/101 |

(Continued)

FOREIGN PATENT DOCUMENTS

| | | |
|---|---|---|
| CN | 102737001 | 10/2012 |
| EP | 2871550 | 5/2015 |

OTHER PUBLICATIONS

Hutton: "Understanding How the New HyperFlex Architecture Enables Next-Generation High-Performance System", Altera Corporation, Apr. 1, 2015 (Apr. 4, 2015), pp. 1-11, XP055310699, Retrieved from the Internet: <URL:http://www.altera.com/en_US/pdfs/literature/wp/wp-01231-understanding-how-hyperflex-architecture-enables-high-performance-sustems-pdf> [retrieved on Oct. 14, 2016].

*Primary Examiner* — Naum B Levin

(57) ABSTRACT

A circuit design may have registers and combinational gates. Circuit design computing equipment may perform register retiming in the circuit design, whereby registers are moved across combinational gates. Information about the register moves may be recorded, and a modified circuit design is created. The circuit design computing equipment may implement the circuit design in an integrated circuit. A logic analyzer may be used to debug the circuit design implemented in the integrated circuit in real-time and at high-speed. To facilitate the debugging process, the circuit design computing equipment may augment the integrated circuit and/or compensate for register retiming based on the information recorded during register retiming.

25 Claims, 11 Drawing Sheets

(56) References Cited

U.S. PATENT DOCUMENTS

| | | | |
|---|---|---|---|
| 7,984,400 B2* | 7/2011 | Maixner | G06F 17/5027 703/13 |
| 8,136,063 B2* | 3/2012 | Ispir | G06F 17/505 703/16 |
| 8,166,435 B2* | 4/2012 | Teig | G06F 17/5054 716/116 |
| 8,250,503 B2* | 8/2012 | Vorbach | G06F 17/5045 716/103 |
| 8,255,848 B2* | 8/2012 | Baumgartner | G06F 17/5031 716/106 |
| 8,296,696 B1* | 10/2012 | Chiu | G06F 17/5054 716/104 |
| 8,423,939 B1* | 4/2013 | Hurst | G06F 17/505 703/19 |
| 8,453,083 B2* | 5/2013 | Hiraoglu | G06F 17/504 716/107 |
| 8,645,885 B1* | 2/2014 | Manohararajah | G06F 17/5054 716/101 |
| 8,813,036 B2 | 8/2014 | Tzoref-Brill | |
| 8,909,579 B2 | 12/2014 | Ivrii et al. | |
| 8,918,748 B1* | 12/2014 | Chiu | G06F 17/505 716/102 |
| 8,929,152 B1* | 1/2015 | Gamsa | G11C 7/20 365/189.011 |
| 8,963,581 B1 | 2/2015 | Lewis et al. | |
| 9,015,012 B2 | 4/2015 | Tzoref-Brill | |
| 9,275,184 B1* | 3/2016 | Chiu | G06F 17/5081 |
| 2007/0025483 A1 | 2/2007 | Emami-Neyestanak et al. | |
| 2009/0002045 A1 | 1/2009 | Hutchings et al. | |
| 2013/0297278 A1 | 11/2013 | Narayanaswamy et al. | |
| 2015/0186561 A1* | 7/2015 | Teig | G06F 17/505 716/134 |
| 2015/0234963 A1* | 8/2015 | Brown | G06F 17/5031 716/106 |

* cited by examiner

METHODS AND APPARATUS FOR PROBING SIGNALS FROM A CIRCUIT AFTER REGISTER RETIMING

BACKGROUND

This relates to integrated circuits and, more particularly, to debugging an integrated circuit after register retiming operations.

Every transition from one technology node to the next technology node has resulted in smaller transistor geometries and thus potentially more functionality implemented per unit of integrated circuit area. Synchronous integrated circuits have further benefited from this development as evidenced by reduced interconnect and cell delays, which have led to performance increases.

To further increase the performance, solutions such as register retiming have been proposed, where registers are moved among portions of combinational logic, thereby achieving a more balanced distribution of delays between registers and thus potentially a higher clock frequency at which the integrated circuit may be operated.

However, performing register retiming may be complicated and error prone, especially when different portions of the integrated circuit operate in different clock domains and when registers have different clocks, clock polarities, or particular reset, preset, and initialization constraints.

SUMMARY

In accordance with certain aspects of the invention, a computer aided design (CAD) tool may receive a circuit design. The circuit design may include multiple registers and first and second interconnects between gates. The CAD tool may perform a retiming operation on the circuit design to create a register-retimed circuit design and record information about the retiming operation. For the purpose of probing signals in the circuit design, the CAD tool may couple the first and second interconnects of the register-retimed circuit design to an acquisition storage circuit. The CAD tool may further insert first additional registers into the register-retimed circuit design between the first interconnect and the acquisition storage circuit based on the recorded information. The CAD tool may inserting second additional registers into the register-retimed circuit design between the second interconnect and the acquisition storage circuit based on the recorded information.

It is appreciated that the present invention can be implemented in numerous ways, such as a process, an apparatus, a system, a device, or a method on a computer readable medium. Several inventive embodiments of the present invention are described below.

In certain embodiments, the above-mentioned CAD tool may probe first and second signals at the respective first and second interconnects of the register-retimed circuit design. For this purpose, the CAD tool may send the first and second probed signals from the first and second interconnects through the first and second additional registers to the acquisition storage circuit.

If desired, during the retiming operation of the circuit design, the CAD tool may move a register of the multiple registers across the first interconnect. For example, the CAD tool may change the configuration of a mode multiplexer that is coupled to an input of the first interconnect from selecting a first input signal to selecting a second input signal, where the first input signal is driven by a routing multiplexer and the second input signal is driven by the register.

Further features of the invention, its nature and various advantages, will be more apparent from the accompanying drawings and the following detailed description of the preferred embodiments.

DETAILED DESCRIPTION

Figure 1:
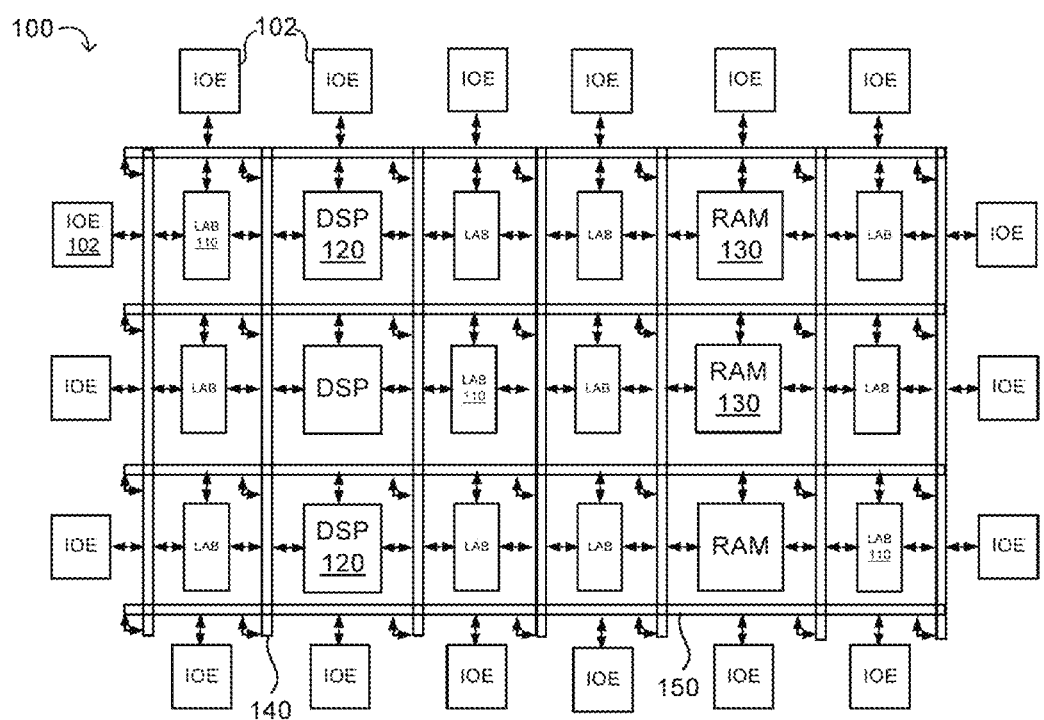
FIG. 1 is a diagram of an illustrative integrated circuit having an exemplary routing topology in accordance with an embodiment.

The presented embodiments relate to integrated circuits and, more particularly, to debugging an integrated circuit after register retiming operations.

Performing register retiming to improve the performance of an integrated circuit may be complicated and error prone, especially when different portions of the integrated circuit operate in different clock domains and registers have different clocks, clock polarity, and/or particular reset, preset, or initialization constraints.

In some scenarios, a circuit designer may wish to debug the implementation of a circuit design (e.g., an integrated circuit) in real-time. For example, if the output of a register of the integrated circuit is provided to an input-output (I/O) pin and is observed (e.g., with an oscilloscope or logic analyzer) to be stuck high rather than toggling, the circuit designer may wish to isolate the source of the failure (i.e., the source of the failure causing the output to be stuck high).

For example, an interconnect that is shorted to a high or low logic level, a timing failure, a functional failure of the integrated circuit, or other types of failures may need to be isolated. Accordingly, the circuit designer may wish to tap, or sample, internal nets (e.g., the interconnect between a logic gate and the register or the interconnect between logic gates, etc.), which are sometimes also referred to as nodes or internal nodes, and observe the state of the signals at these nodes in order to isolate the failure.

For example, the circuit designer may want to incrementally tap signals and follow a failure to its source. That is, the circuit designer may wish to follow the failure from the output of the register to the source by checking the signals at the interconnects in the cone of logic that ends at the input of the register. The designer may first tap the interconnect at the input of the register (e.g., between a logic gate and the register). Next, if tapping the interconnect at the input of the register is not believed to isolate the failure, the designer may tap the interconnects at the input of the logic gate.

However, performing register retiming may change the behavior of many internal nodes (e.g., by moving one or more registers across an internal node), thereby changing the observed behavior of those internal nodes in the circuit design implementation. As a result, many internal nodes in the circuit design implementation may exhibit a behavior that is different than the originally intended behavior of the respective node as specified by the designer in the circuit design. However, the fact that the observed behavior is different than the desired behavior may not be indicative of an error in the circuit design implementation.

It may therefore be desirable to record information about the registers that are moved during register retiming and to instrument the respective circuit design implementation accordingly such that a logic analyzer may be used to debug the circuit design implementation after a register retiming operation has been performed.

It will be recognized by one skilled in the art, that the present exemplary embodiments may be practiced without some or all of these specific details. In other instances, well-known operations have not been described in detail in order not to unnecessarily obscure the present embodiments.

An illustrative embodiment of an integrated circuit such as programmable logic device (PLD) 100 that may be configured to implement a circuit design is shown in FIG. 1. As shown in FIG. 1, the programmable logic device (PLD) may include a two-dimensional array of functional blocks, including logic array blocks (LABs) 110 and other functional blocks, such as random access memory (RAM) blocks 130 and digital signal processing (DSP) blocks 120, for example. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain programmable memory elements. Memory elements may be loaded with configuration data (also called programming data) using input-output elements (IOEs) 102. Once loaded, the memory elements each provide a corresponding static control signal that controls the operation of an associated functional block (e.g., LABs 110, DSP 120, RAM 130, or input-output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory, configuration RAM (CRAM), or programmable memory elements.

In addition, the programmable logic device may have input-output elements (IOEs) 102 for driving signals off of PLD and for receiving signals from other devices. Input-output elements 102 may include parallel input-output circuitry, serial data transceiver circuitry, differential receiver and transmitter circuitry, or other circuitry used to connect one integrated circuit to another integrated circuit. As shown, input-output elements 102 may be located around the periphery of the chip. If desired, the programmable logic device may have input-output elements 102 arranged in different ways. For example, input-output elements 102 may form one or more columns of input-output elements that may be located anywhere on the programmable logic device (e.g., distributed evenly across the width of the PLD). If desired, input-output elements 102 may form one or more rows of input-output elements (e.g., distributed across the height of the PLD). Alternatively, input-output elements 102 may form islands of input-output elements that may be distributed over the surface of the PLD or clustered in selected areas.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include pipeline elements, and the contents stored in these pipeline elements may be accessed during operation. For example, a programming circuit may provide read and write access to a pipeline element.

Note that other routing topologies, besides the topology of the interconnect circuitry depicted in FIG. 1, are intended to be included within the scope of the present invention. For example, the routing topology may include wires that travel diagonally or that travel horizontally and vertically along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

If desired, programmable logic device (PLD) 100 may be configured to implement a circuit design. For example, the configuration RAM may be programmed such that LABs 110, DSP 120, and RAM 130, programmable interconnect circuitry (i.e., vertical channels 140 and horizontal channels 150), and the input-output elements 102 form the circuit design implementation.

For debugging purposes, a logic analyzer may provide the control to select specific nodes inside the circuit design, thereby instrumenting the circuit design implementation in PLD 100. The logic analyzer may capture data at those nodes and route the captured data to acquisition storage circuit, which may be one or more of RAM 130, and access the captured data for debugging. Alternatively, the logic analyzer may route the captured data to input-output elements 102 and use an external logic analyzer or oscilloscope for debugging.

It should be understood that embodiments may be implemented in any integrated circuit and that a logic analyzer may probe any node of any functional block in such an integrated circuit. If desired, these functional blocks may be arranged in multiple levels or layers in which multiple functional blocks are interconnected to form still larger blocks.

Figure 2:
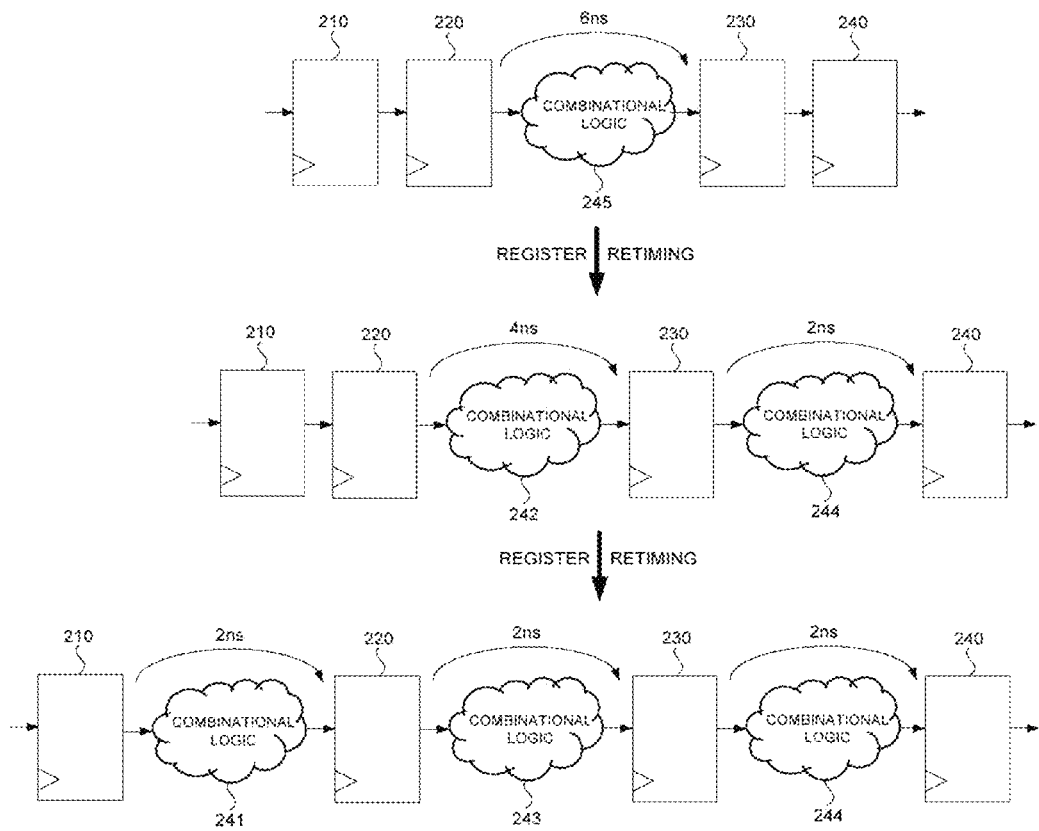
FIG. 2 is a diagram of illustrative retiming operations in accordance with an embodiment.

FIG. 2 shows an example of different versions of a circuit design that PLD 100 may implement. The first version of the circuit design may include registers 210, 220, 230, 240, and combinational logic 245. Register 210 may send a signal to register 220; register 220 may send the signal through combinational logic 245 to register 230; and register 230 may send the signal to register 240. As an example, the delay on the path from register 220 through combinational logic 245 to register 230 may have a delay of 6 nanoseconds (ns), whereas the delay between register 210 and 220 and between registers 230 and 240 may have a delay of 0 ns. Thus, the first version of the circuit design may operate at a frequency of 166 MHz.

Performing register retiming on the first version of the circuit design may create a second version of the circuit design. For example, register 230 may be pushed back through a portion of combinational logic 245, thereby separating combinational logic 245 of the first version of the circuit design into combinational logic 242 and 244 of the second version of the circuit design. In the second version of the circuit design, register 210 may send a signal to register 220; register 220 may send the signal through combinational logic 242 to register 230; and register 230 may send the signal through combinational logic 244 to register 240.

As an example, the delay on the path from register 220 through combinational logic 242 to register 230 may have a delay of 4 ns, and the delay from register 230 through combinational logic 244 to register 240 may have a delay of 2 ns. Thus, the second version of the circuit design may operate at a frequency of 250 MHz.

Performing register retiming on the second version of the circuit design may create a third version of the circuit design. For example, register 220 may be pushed forward through a portion of combinational logic 242, thereby separating combinational logic 242 of the second version of the circuit design into combinational logic 241 and 243 of the third version of the circuit design. In the third version of the circuit design, register 210 may send a signal through combinational logic 241 to register 220; register 220 may send the signal through combinational logic 243 to register 230; and register 230 may send the signal through combinational logic 244 to register 240.

As an example, the delay on the paths from register 210 through combinational logic 241 to register 220, from register 220 through combinational logic 243 to register 230, and from register 230 through combinational logic 244 to register 240 may all have a delay of 2 ns. Thus, the third version of the circuit design may operate at a frequency of 500 MHz, which is thrice the frequency at which the first version of the circuit design may operate.

Figure 3:
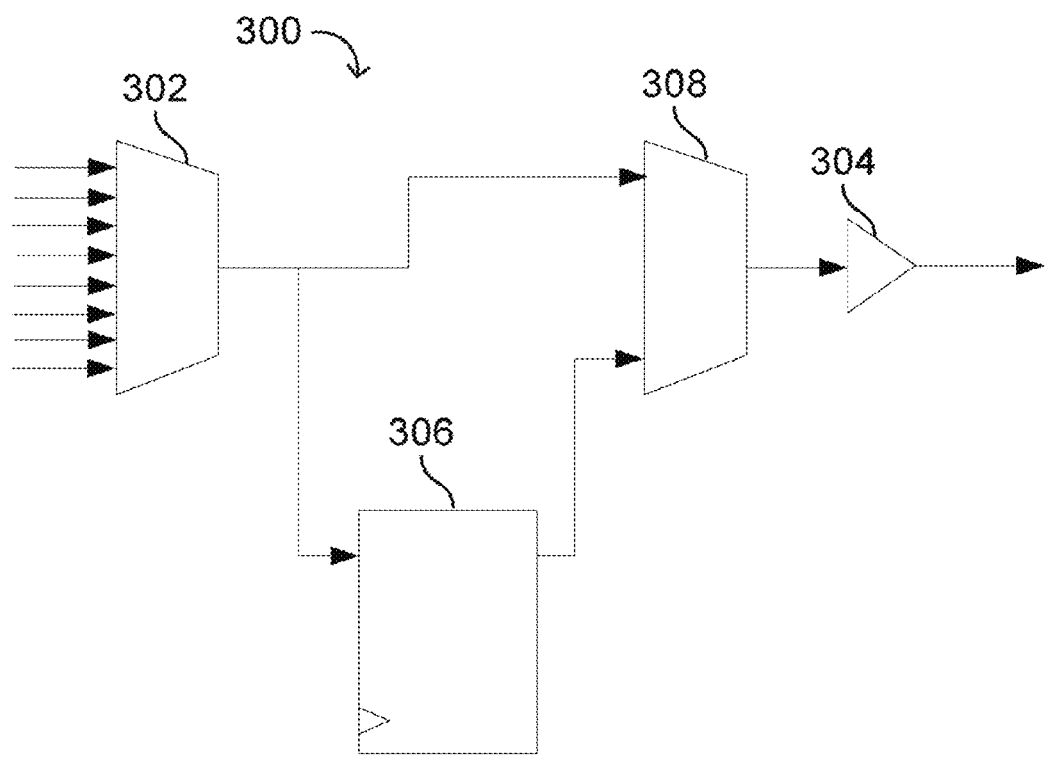
FIG. 3 is a diagram of an illustrative pipelined routing resource which uses a register to pipeline a routing signal in accordance with an embodiment.

If desired, routing resources such as the vertical routing channels 140 or the horizontal routing channels 150 of FIG. 1 may include pipeline elements, which can facilitate register retiming. FIG. 3 depicts a pipelined routing resource 300 which uses a register in accordance with an embodiment. As shown, the pipelined routing resource 300 includes a first multiplexer 302, a driver 304, a register 306, and a second multiplexer 308.

Multiplexer 302 may be a driver input multiplexer (DIM) or a functional block input multiplexer (FBIM). A DIM may select a signal from multiple sources and send the selected signal to driver 304 that drives the wire. The multiple sources may include signals from outputs of functional blocks and other routing wires that travel in the same or in an orthogonal direction to the wire. A FBIM outputs a signal to a functional block and may select the signal from multiple routing wires.

As shown in FIG. 3, in accordance with an embodiment of the invention, the multiplexer 302 may be pipelined by providing its output to the data input of register 306. Multiplexer 308 in the pipelined routing resource 300 may receive the output of multiplexer 302 directly and may also receive the data output from register 306.

Although the pipelined routing resource 300 includes a register, it will be recognized by one skilled in the art that different register implementations may be used to store a routing signal such as an edge-triggered flip-flop, a pulse latch, a transparent-low latch, a transparent-high latch, just to name a few. Thus, in order not to unnecessarily obscure the present embodiments, we refer to the storage circuit in the pipelined routing resource as a pipeline storage element.

Multiplexer 308 may enable the pipelined routing resource 300 to be either used in a non-pipeline mode or in a pipeline register mode. In the non-pipeline mode, the output of multiplexer 309 selects the direct output of multiplexer 302.

In the pipeline mode, multiplexer 308 may select the output of register 306. Multiplexer 308 may provide its output to driver circuit 304, and the output of driver circuit 304 may be used to drive a routing wire. The routing wire may span multiple functional blocks (e.g., for a pipelined routing resource with a DIM). Alternatively, the routing wire may be inside a functional block (e.g., for a pipelined routing resource with a FBIM).

Every DIM/FBIM may include a register such as register 306 such that all the routing multiplexers are pipelined. However, in some embodiments, that may be unnecessary as the capabilities provided may exceed design requirements. Thus, in certain embodiments only a fraction, such as one-half or one-fourth, of the routing multiplexers may be pipelined. For example, a signal may take 150 picoseconds (ps) to traverse a wire of a given length, but a clock signal may be constrained to operate with a 650 ps clock cycle. Thus, providing a pipeline register such as register 306 every fourth wire may be sufficient in this example. Alternatively the registers may be placed more frequently than every fourth wire (e.g., every second wire) to provide a higher degree of freedom in selection of which registers are used.

Pipelined routing resources such as pipelined routing resource 300 may facilitate register retiming operations, such as the register retiming illustrated in FIG. 2. For example, consider the scenario in which register 230 is implemented by a first instance of a pipelined routing element that is operated in pipeline register mode (i.e., register 230 is implemented by register 306 of a first instance of a pipelined routing resource 300). Consider further that the path from register 220 through combinational logic 245 to register 230 includes a second instance of a pipelined routing element that is operated in non-pipeline mode. Thus, switching the first instance of the pipelined routing element from operating in pipeline register mode to operating in non-pipeline mode and switching the second instance of the pipelined routing element from operating in non-pipeline mode to operating in pipeline register mode may transform the first version into the second version of the circuit design presented in FIG. 2.

CAD tools in a circuit design system may evaluate whether register retiming may improve the performance of a current version of a circuit design or whether the current version of the circuit design meets a given performance criterion. If desired, and in the event that the CAD tools determine that register retiming would improve the performance of the current version of the circuit design or that the current version of the circuit design misses the given performance criterion, the CAD tools may execute register retiming operations that transform the current version of the circuit design into another version of the circuit design (e.g., as illustrated in FIG. 2).

Figure 4:
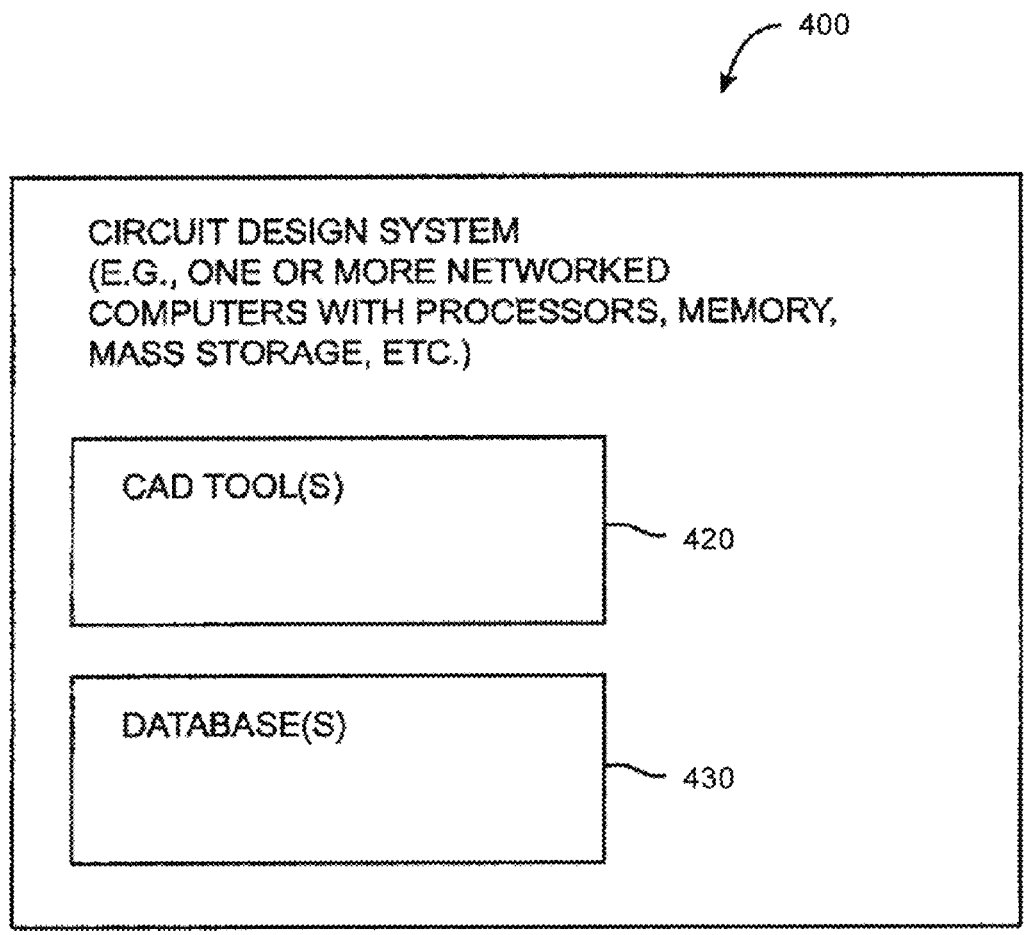
FIG. 4 is a diagram of a circuit design system that may be used to design integrated circuits in accordance with an embodiment.

An illustrative circuit design system 400 in accordance with an embodiment is shown in FIG. 4. System 400 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 420 and databases 430 reside on system 400. During operation, executable software such as the software of computer aided design tools 420 runs on the processor(s) of system 400. Databases 430 are used to store data for the operation of system 400. In general, software and data may be stored on any computer-readable medium (storage) in system 400. Such storage may include computer memory chips, removable and fixed media such as hard disk drives, flash memory, compact discs (CDs), digital versatile discs (DVDs), blu-ray discs (BDs), other optical media, and floppy diskettes, tapes, or any other suitable memory or storage device(s). When the software of system 400 is installed, the storage of system 400 has instructions and data that cause the computing equipment in system 400 to execute various methods (processes). When performing these processes, the computing equipment is configured to implement the functions of the circuit design system.

The computer aided design (CAD) tools 420, some or all of which are sometimes referred to collectively as a CAD tool, a circuit design tool, or an electronic design automation (EDA) tool, may be provided by a single vendor or by multiple vendors. Tools 420 may be provided as one or more suites of tools (e.g., a compiler suite for performing tasks associated with implementing a circuit design in a programmable logic device) and/or as one or more separate software components (tools). Database(s) 430 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 5:
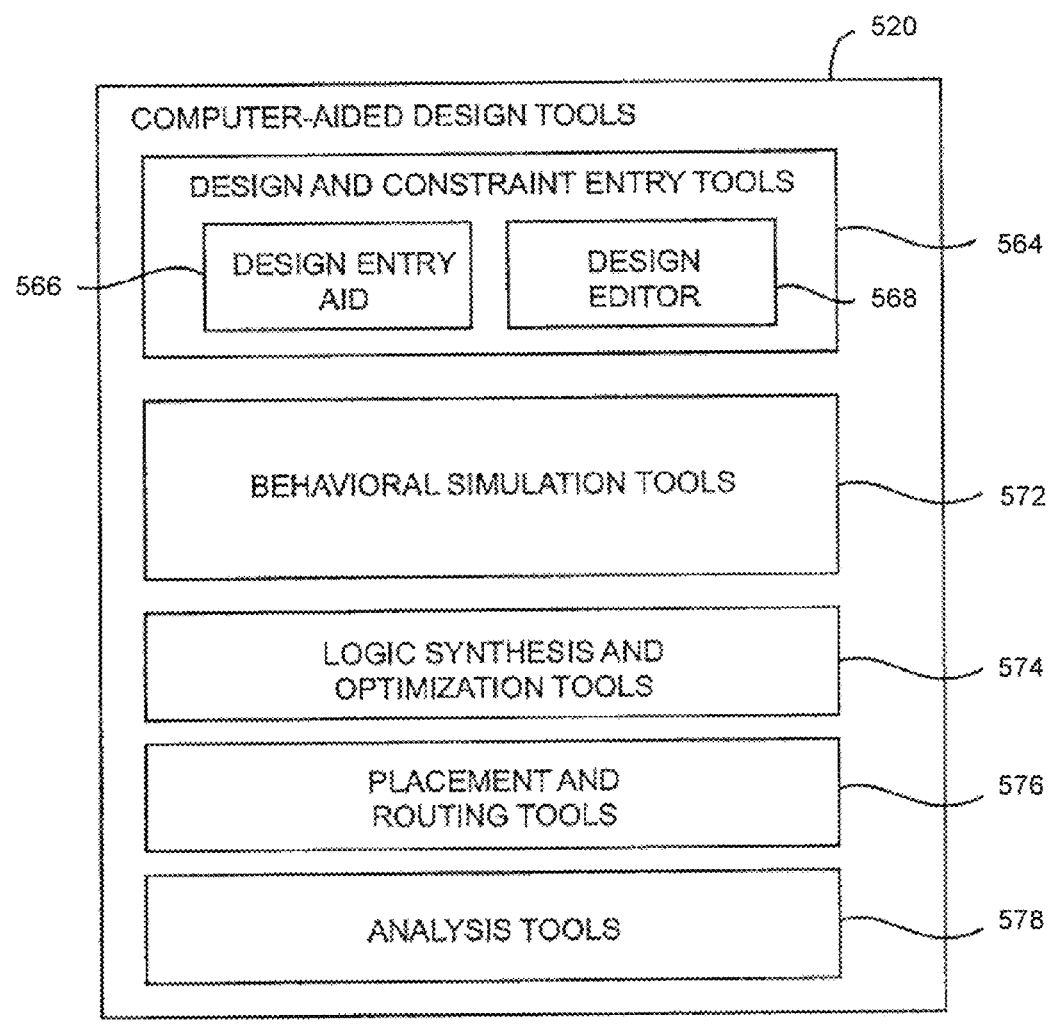
FIG. 5 is a diagram of illustrative computer-aided design (CAD) tools that may be used in a circuit design system in accordance with an embodiment.

Illustrative computer aided design tools 520 that may be used in a circuit design system such as circuit design system 400 of FIG. 4 are shown in FIG. 5.

The design process may start with the formulation of functional specifications of the integrated circuit design (e.g., a functional or behavioral description of the integrated circuit design). A circuit designer may specify the functional operation of a desired circuit design using design and constraint entry tools 564. Design and constraint entry tools 564 may include tools such as design and constraint entry aid 566 and design editor 568. Design and constraint entry aids such as aid 566 may be used to help a circuit designer locate a desired design from a library of existing circuit designs and may provide computer-aided assistance to the circuit designer for entering (specifying) the desired circuit design.

As an example, design and constraint entry aid 566 may be used to present screens of options for a user. The user may click on on-screen options to select whether the circuit being designed should have certain features. Design editor 568 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 564 may be used to allow a circuit designer to provide a desired circuit design using any suitable format. For example, design and constraint entry tools 564 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 564 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 564 may allow the circuit designer to provide a circuit design to the circuit design system 400 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 568. Blocks of code may be imparted from user-maintained or commercial libraries if desired.

After the design has been entered using design and constraint entry tools 564, behavioral simulation tools 572 may be used to simulate the functional performance of the circuit design. If the functional performance of the design is incomplete or incorrect, the circuit designer can make changes to the circuit design using design and constraint entry tools 564. The functional operation of the new circuit design may be verified using behavioral simulation tools 572 before synthesis operations have been performed using tools 574. Simulation tools such as behavioral simulation tools 572 may also be used at other stages in the design flow if desired (e.g., after logic synthesis). The output of the behavioral simulation tools 572 may be provided to the circuit designer in any suitable format (e.g., truth tables, timing diagrams, etc.).

Once the functional operation of the circuit design has been determined to be satisfactory, logic synthesis and optimization tools 574 may generate a gate-level netlist of the circuit design, for example using gates from a particular library pertaining to a targeted process supported by a foundry, which has been selected to produce the integrated circuit. Alternatively, logic synthesis and optimization tools 574 may generate a gate-level netlist of the circuit design using gates of a targeted programmable logic device (i.e., in the logic and interconnect resources of a particular programmable logic device product or product family).

Logic synthesis and optimization tools 574 may optimize the design by making appropriate selections of hardware to implement different logic functions in the circuit design based on the circuit design data and constraint data entered by the logic designer using tools 564. As an example, logic synthesis and optimization tools 574 may perform register retiming on the circuit design based on the length of a combinational path between registers in the circuit design and corresponding timing constraints that were entered by the logic designer using tools 564.

After logic synthesis and optimization using tools 574, the circuit design system may use tools such as placement and routing tools 576 to perform physical design steps (layout synthesis operations). Placement and routing tools 576 are used to determine where to place each gate of the gate-level netlist produced by tools 574. For example, if two counters interact with each other, the placement and routing tools 576 may locate these counters in adjacent regions to reduce interconnect delays or to satisfy timing requirements specifying the maximum permitted interconnect delay. The placement and routing tools 576 create orderly and efficient implementations of circuit designs for any targeted integrated circuit (e.g., for a given programmable integrated circuit such as a field-programmable gate array (FPGA).)

Tools such as tools 574 and 576 may be part of a compiler suite (e.g., part of a suite of compiler tools provided by a programmable logic device vendor). In certain embodiments, tools such as tools 574, 576, and 578 may also include timing analysis tools such as timing estimators. This allows tools 574 and 576 to satisfy performance requirements (e.g., timing requirements) before actually producing the integrated circuit.

As an example, tools 574 and 576 may perform register retiming by moving registers through combinational logic (e.g., through logical AND, OR, XOR, etc. gates, look-up tables (LUTs), multiplexers, arithmetic operators, etc.). Tools 574 and 576 may push registers forward or backward across combinational logic as illustrated in FIG. 2. If desired, tools 574 and 576 may perform forward and backward pushes of registers by configuring pipelined routing resources such as pipelined routing resource 300 of FIG. 3 to operate in non-pipeline mode or as a pipelined routing element.

After an implementation of the desired circuit design has been generated using placement and routing tools 576, the implementation of the design may be analyzed and tested using analysis tools 578. For example, analysis tools 578 may include timing analysis tools, power analysis tools, or formal verification tools, just to name few.

After satisfactory optimization operations have been completed using tools 520 and depending on the targeted integrated circuit technology, tools 520 may produce a mask-level layout description of the integrated circuit or configuration data for programming the programmable logic device.

In certain embodiments, tools such as tools 574, 576, and 578 may also include debugging tools such as logic analyzers. This allows tools 574 and 576 to insert so-called probes which are routes from internal nodes of the design to an acquisition storage circuit or to an external pin during logic synthesis and optimization and/or during layout synthesis operations. For debugging purposes, tools 578 may tap the probes (i.e., extract the state of those internal nodes) during execution of the design implementation in the integrated circuit. If desired, tools 578 may facilitate the analysis of the tapped probes, for example by displaying the tapped probes as waveforms.

Figure 6:
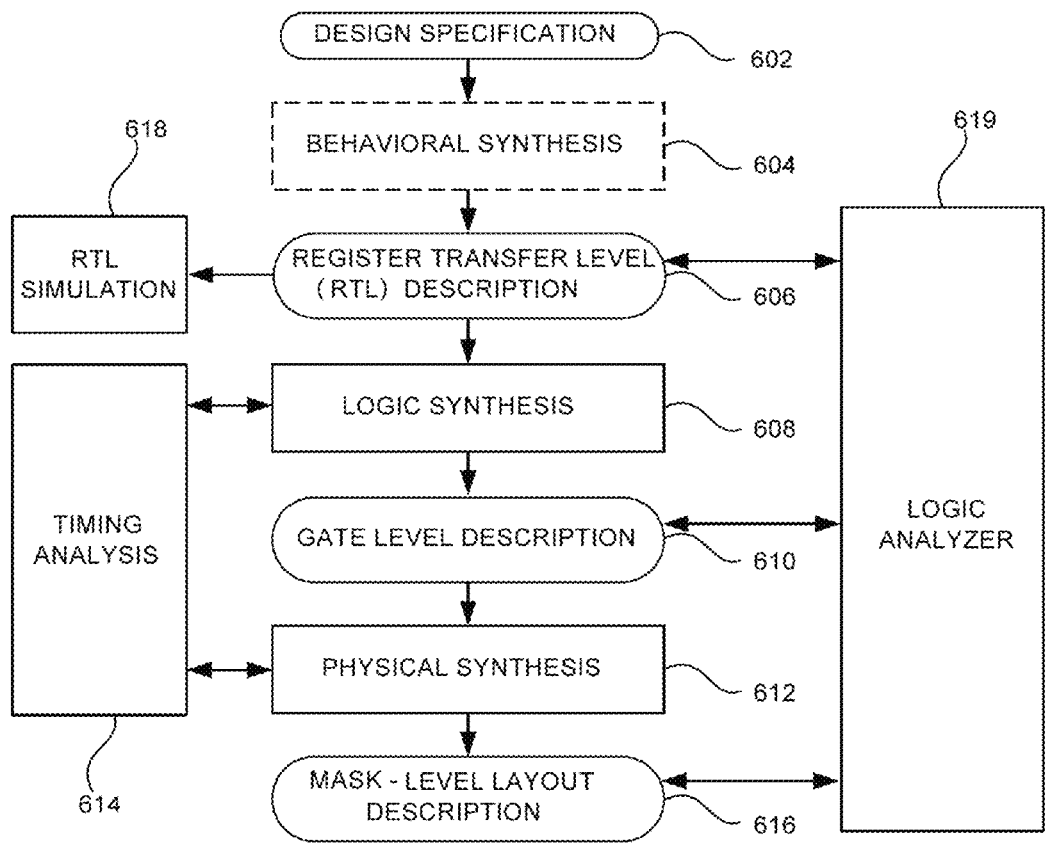
FIG. 6 is a flow chart of illustrative steps for designing an integrated circuit in accordance with an embodiment.

Illustrative operations involved in using tools 520 of FIG. 5 to produce the mask-level layout description of the integrated circuit are shown in FIG. 6. As shown in FIG. 6, a circuit designer may first provide a design specification 602. The design specification 602 may, in general, be a behavioral description provided in the form of an application code (e.g., C code, C++ code, SystemC code, OpenCL code, etc.). In some scenarios, the design specification may be provided in the form of a register transfer level (RTL) description 606.

The RTL description may have any form of describing circuit functions at the register transfer level. For example, the RTL description may be provided using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL). If desired, a portion or all of the RTL description may be provided as a schematic representation.

In general, the behavioral design specification 602 may include untimed or partially timed functional code (i.e., the application code does not describe cycle-by-cycle hardware behavior), whereas the RTL description 606 may include a fully timed design description that details the cycle-by-cycle behavior of the circuit at the register transfer level.

Design specification 602 or RTL description 606 may also include target criteria such as area use, power consumption, delay minimization, clock frequency optimization, or any combination thereof. The optimization constraints and target criteria may be collectively referred to as constraints.

Those constraints can be provided for individual data paths, portions of individual data paths, portions of a design, or for the entire design. For example, the constraints may be provided with the design specification 602, the RTL description 606 (e.g., as a pragma or as an assertion), in a constraint file, or through user input (e.g., using the design and constraint entry tools 564 of FIG. 5), to name a few.

In certain embodiments, a given data path may have more than one constraint associated with the path, and some of these constraints may be in conflict with each other e.g., a constraint received with the behavioral design specification for a given path may conflict with the constraint received with the RTL description and with a constraint received with a constraint file. In this scenario, a predetermined priority of constraints, which may be defined explicitly or resolved implicitly by CAD tools 520, may determine which of the conflicting constraints is selected. For example, the constraint from the user or a configuration file may override the constraints received from other sources, and a constraint received with the RTL description may override a constraint received with the behavioral design specification.

The constraints may target the entire circuit design or portions of the circuit design. For example, some constraints may be defined globally and thus be applicable to the entire circuit design. Other constraints may be assigned locally and thus be applicable only to the corresponding portions of the circuit design. Consider the scenario in which the circuit design is organized hierarchically. In this scenario, every hierarchical instance may include different assignments. In other words, multiple different constraints may target the same portion of the circuit design, and priorities may be defined explicitly or resolved implicitly by CAD tools 520. For example, a constraint defined at a higher level of the design hierarchy may override a constraint at a lower level. Alternatively, a constraint defined at a lower level of the design hierarchy may override a constraint at a higher level, or individual levels of the design hierarchy may be given priority over other levels of design hierarchy.

Constraints included in design specification 602 or RTL description 606 may be conveyed to CAD tools 520 in the form of variables, parameters, compiler directives, macros, pragmas, or assertions, just to name a few. CAD tools 520 may use a constraint file, which may include a portion or all of the constraints. Such a constraint file may be included with design specification 602 or RTL description 606. In some scenarios, a portion or all of the constraints may be embedded in the circuit design. Alternatively, the constraints may have been defined using the design and constraint entry tools 564 (see FIG. 5).

At step 604, behavioral synthesis (sometimes also referred to as algorithmic synthesis) may be performed to convert the behavioral description into an RTL description 606. Step 604 may be skipped if the design specification is already provided in form of an RTL description.

At step 618, behavioral simulation tools 572 may perform an RTL simulation of the RTL description, which may verify the functional performance of the RTL description. If the functional performance of the RTL description is incomplete or incorrect, the circuit designer can make changes to the HDL code (as an example). During RTL simulation 618, actual results obtained from simulating the behavior of the RTL description may be compared with expected results.

During step 608, logic synthesis operations may generate gate-level description 610 using logic synthesis and optimization tools 574 from FIG. 5. If desired, logic synthesis operations may perform register retiming as illustrated in FIG. 2 according to the constraints that are included in design specification 602 or RTL description 606.

During step 612, physical synthesis operations (e.g., place and route and optimization operations using for example placement and routing tools 576) may place and connect the different gates in gate-level description 610 in a preferred location on the targeted integrated circuit to meet given target criteria (e.g., minimize area and maximize routing efficiency or minimize path delay and maximize clock frequency or any combination thereof).

If desired, physical synthesis operations may perform register retiming as illustrated in FIG. 2 and according to the constraints that are included in design specification 602 or RTL description 606. As an example, physical synthesis operations may perform register retiming by changing the configuration of some pipelined routing resources (e.g., some instances of pipelined routing resource 300 of FIG. 3) from operating in pipeline register mode to operating in non-pipelined mode and the configuration of other pipelined routing resources (e.g., other instances of pipelined routing resources 300 of FIG. 3) from operating in non-pipelined mode to operating in pipeline register mode. The output of physical synthesis 612 is a mask-level layout description 616.

Circuit design system 400 may include a timing estimator (e.g., formed as part of optimization tools 574, tools 576, or tools 578) that may be used to estimate delays between synchronous elements of the circuit design during step 614. For example, timing estimator may estimate delays between sequential elements such as registers and storage circuits (e.g., based on the lengths of interconnects, intermediate combinational logic, etc.). The delays may, if desired, be estimated based on metrics such as slack (e.g., the difference between a required arrival time and the arrival time of a signal), slack-ratios, interconnect congestion, or other timing metrics. Circuit design system 400 may use the estimated delays to determine the locations of groups of circuitry while helping to ensure that delays satisfy timing requirements (e.g., critical path delay requirements) or other performance constraints.

Consider the scenario in which a circuit design has a given path from a register through combinational logic to another register and that this given path misses one or more target criteria. For example, the timing estimator may determine that the given path is associated with a delay that is larger than the target delay specified for the path as one of the target criteria. The timing estimator may detect that the given path has a larger delay before, during, and after logic synthesis 608 or before, during, and after physical synthesis 612, which may include operations such as clustering, partitioning, placement, and routing, just to name a few. In this scenario, logic synthesis 608 or physical synthesis 612 may perform register retiming (e.g., the register retiming operations described in FIG. 2), thereby reducing the delay through the combinational logic between the registers and potentially improving the performance of the given path.

If desired, the tool that executes the register retiming operation may record information about the register retiming operation. For example, the tool may record information about the number of registers pushed forward through a node, the number of registers pushed backward through a node, the difference between the number of registers pushed forward minus the number of registers pushed backward, etc. If desired, the tool may record information about each register. For example, the tool may record clocking information (e.g., the name of the clock signal, the frequency, the phase, etc.), information about initial conditions, and information about reset conditions (e.g., asynchronous reset and/or synchronous reset), to name a few.

Circuit design system 400 may include a logic analyzer (e.g., formed as part of tools 578) that a circuit designer may use for debugging the integrated circuit that implements the circuit design in real-time and at high-speed. As shown, logic analyzer 619 may insert taps into the RTL description 606, the gate-level description 610, and/or the mask-level description 616 to capture signals from internal circuit design nodes. If desired, logic analyzer 619 may also provide the control to add or to delete nodes that are tapped in an existing debugging process. Logic analyzer 619 may provide a connection from all selected nodes to an acquisition storage circuit or a connection from those nodes to an input-output pin.

After a change in the selection of nodes, tools 574 and 576 may recompile the circuit design. As an example, logic analyzer 619 may add nodes to the selection of nodes and the routing connections between those nodes and the acquisition storage circuit to RTL description 606. The change in RTL description 606 may require the execution of logic synthesis operations during step 608 and the execution of physical synthesis operations during step 612. In certain embodiments, logic analyzer may provide the control to enable, disable or modify nodes in gate-level description 610 or mask-level layout description 616 without fully recompiling the circuit design. For example, changing the node selection in the gate-level description may only require the execution of physical synthesis operations during step 612.

In certain embodiments, tool 574 may perform incremental logic synthesis operations during step 608 as a result of incremental changes in RTL description 606. Incremental logic synthesis operations may preserve the majority of the original gate-level description 610 while restricting modifications to the portions of the gate-level description that are affected by the incremental changes in RTL description 606.

Similarly, tool 576 may perform incremental physical synthesis operations during step 612 as a result of incremental changes in gate-level description 610. Incremental physical synthesis operations may preserve the majority of the original mask-level layout description 616 while restricting modifications to the portions of the mask-level layout description that are affected by the incremental changes in gate-level description 610.

Inserting taps to sample signals (e.g., with logic analyzer 619) at selected internal nodes or making changes to the node selection that a circuit designer wants to sample with logic analyzer 619 may result in incremental changes to RTL description 606, gate-level description 610 and/or mask-level layout description 616. These changes to RTL description 606, gate-level description 610 and/or mask-level layout description 616 may be caused by the insertion of routing connections between the added nodes and the acquisition storage circuit or input-output pins and the removal of routing connections between the removed nodes and the acquisition storage circuit or input-output pins. As a result, tools 574 and 576 may perform incremental logic synthesis operations during step 608 and incremental physical synthesis operations during step 612, respectively.

Logic analyzer 619 may provide the control to set trigger conditions up and sample data according to those trigger conditions. As an example, trigger conditions may describe logic events with logic conditions for signals. If desired, trigger conditions may be based on a sequence of events involving comparisons, logical operators, and/or reduction operators. Trigger conditions may specify when logic analyzer 619 starts and stops data acquisition from the tap points.

Logic analyzer 619 may add trigger conditions in form of RTL code to RTL description 606 or in form of a gate-level netlist to gate-level description 610. A change in RTL description 606 may require the execution of logic synthesis operations during step 608 and the execution of physical synthesis operations during step 612. A change in gate-level description 610 may require the execution of physical synthesis operations during step 612. Logic synthesis operations and/or physical synthesis operations may be incremental (i.e., limited to the modified portion of the RTL description 606 and/or the modified portion of the gate-level description 610).

Logic analyzer 619 may perform data acquisition during the operation of the integrated circuit that implements the circuit design. During data acquisition, logic analyzer 619 may capture data from the tap points into the acquisition storage circuit continuously.

For the purpose of data analysis, logic analyzer 619 may route the captured data from the acquisition storage circuit via the JTAG port to a waveform display pane or to input-output pins of the integrated circuit for use by an external logic analyzer or oscilloscope.

The waveform display pane may allow for viewing, printing, or editing of waveform views of the captured data. As an example, the waveform display pane may allow for inserting time bars, further editing the properties of nodes, editing buses and bus values, and printing waveforms, just to name a few. Logic analyzer 619 may also allow for exporting the data into another format for further analysis.

Figure 7A:
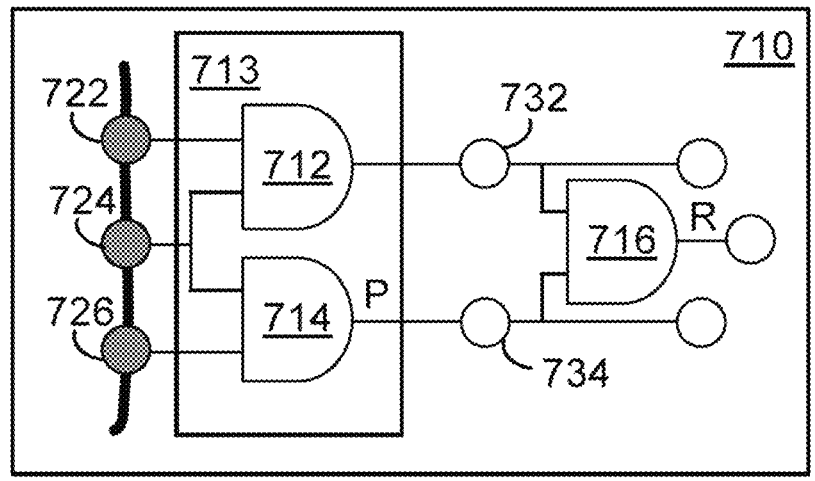
FIG. 7A is a diagram of an illustrative circuit before a register retiming operation and with probed signals being routed to an acquisition storage circuit with forward pushed registers during a register retiming operation in accordance with an embodiment.
Figure 7A:
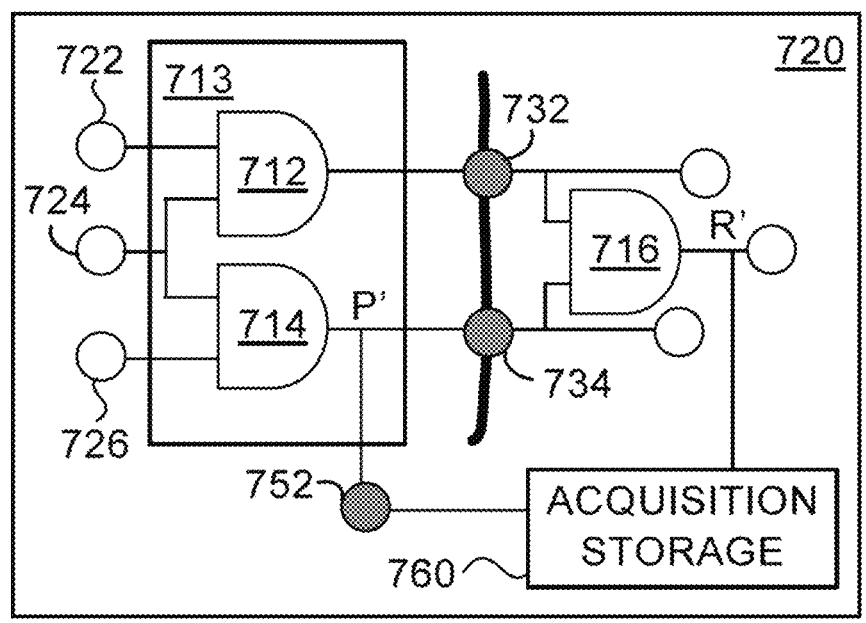

As an example, consider circuit design 710 of FIG. 7A (e.g., in form of gate-level description 610 of FIG. 6) and integrated circuit 720 as the implementation of the circuit design (e.g., in form of mask-level layout description 616 of FIG. 6). As shown, circuit design 710 and integrated circuit 720 may include pipelined routing resources 722, 724, 726, 732, and 734 (e.g., pipelined routing resource 300 of FIG. 3), logic AND gate 716 and combinational gate 713, which may include logic AND gates 712 and 714, respectively.

Consider further that circuit design 710 operates pipelined routing resources 722, 724, and 726 in pipelined register mode and pipelined routing resources 732 and 734 in non-pipelined mode. A CAD tool (e.g., CAD tool 520 of FIG. 5) may perform a register retiming operation on circuit design 710. For example, the register retiming operation may configure pipelined routing resources 722, 724, and 726 to operate in non-pipelined mode and pipelined routing resources 732 and 734 in pipelined register mode, thereby effectively pushing registers forward across combinational gate 713 and creating integrated circuit 720.

If desired, the CAD tool may record information about the register retiming information. For example, the CAD tool may for each node (e.g., for nodes P and R) record the difference between registers pushed forward through the node and registers pushed backward through the node. In the example of integrated circuit 720, nodes P' and R' may have a difference between forward and backward pushed registers that is equal to one and zero, respectively.

As an example, consider that the user wants to probe, or sample, signals at the output of logic AND gates 714 and 716. For that purpose, the CAD tool may insert taps into integrated circuit 710 (e.g., into gate-level description 610 of FIG. 6) at nodes P and R (i.e., at the outputs of logic AND gates 714 and 716) to capture signals from those nodes. A logic analyzer (e.g., logic analyzer 619 of FIG. 6) may provide acquisition storage circuit 760 and a connection from the outputs of logic AND gates 714 and 716 to acquisition storage circuit 760. A CAD tool (e.g., tool 576 of FIG. 5) may incrementally recreate integrated circuit 720 with connections from retimed nodes P' and R' to acquisition storage 760, which may store the probed signals for further analysis.

During the analysis of the probed signals, a CAD tool may compare the expected value at node P at the output of logic AND gate 714 in circuit design 710 with the probed signal at node P' at the output of logic AND gate 714 in integrated circuit 720.

In this example, nodes P and P' may not be equivalent after the same number of clock cycles. However, nodes P and P' may be equivalent after a different number of clock cycles. For example, node P' delayed by one clock cycle may be equivalent to node P.

If desired, the logic analyzer may compute an offset for the data sampled at node P'. The logic analyzer may compensate for the offset and re-align the data to node P (e.g., in the waveform display pane). If desired, the logic analyzer may provide the control to switch between viewing the actually sampled data at node P' and the re-aligned data at node P.

Alternatively, the logic analyzer may determine a number of registers to insert between each tap point and the acquisition storage circuit based on the recorded register retiming information. For example, the logic analyzer may for all sampled nodes determine the minimum of the difference between forward and backward pushed registers (i.e., zero for node R') and add the absolute value of that difference to the difference recorded for each sampled node (i.e., one for P' and zero for R') to determine the number of registers that need to be inserted between the respective node and the acquisition storage circuit.

In the example of integrated circuit 720, one register (e.g., register 752) needs to be inserted between node P' and acquisition storage circuit 760, whereas no register needs to be inserted between node R' and acquisition storage circuit 760 in integrated circuit 720.

Figure 7B:
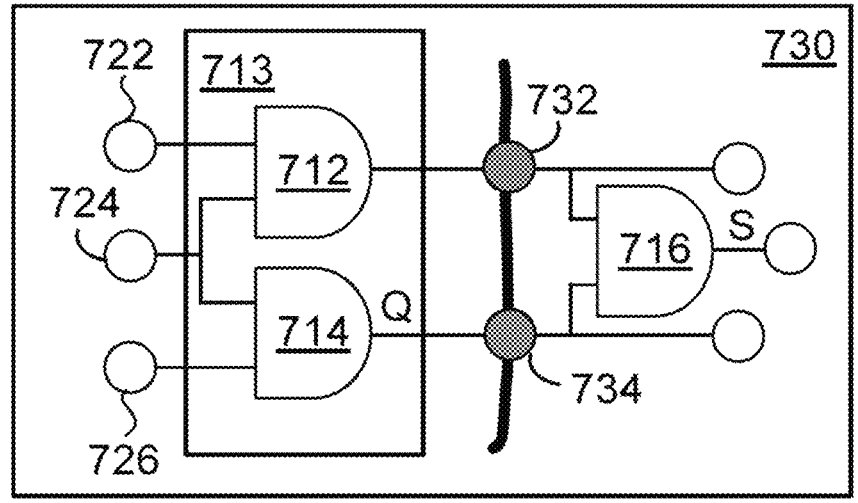
FIG. 7B is a diagram of an illustrative circuit before a register retiming operation and with probed signals being routed to an acquisition storage circuit with backward pushed registers during a register retiming operation in accordance with an embodiment.
Figure 7B:
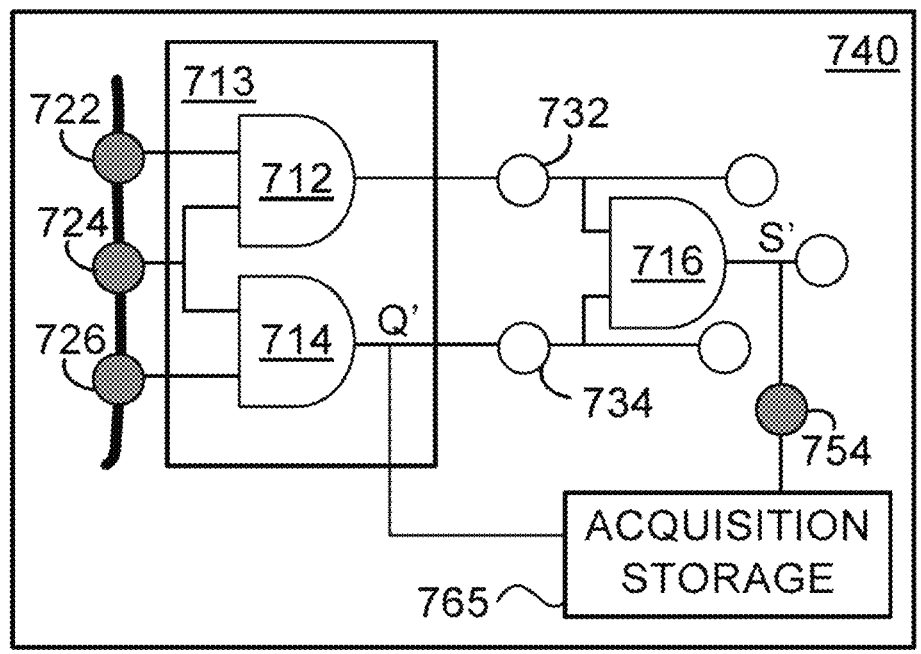

As another example, consider circuit design 730 of FIG. 7B (e.g., in form of gate-level description 610 of FIG. 6) and integrated circuit 740 as the implementation of the circuit design (e.g., in form of mask-level layout description 616 of FIG. 6). As shown, circuit design 730 and integrated circuit 740 may include pipelined routing resources 722, 724, 726, 732, and 734 (e.g., pipelined routing resource 300 of FIG. 3), logic AND gate 716 and combinational gate 713, which may include logic AND gates 712 and 714, respectively.

Consider further that circuit design 730 operates pipelined routing resources 722, 724, and 726 in non-pipelined register mode and pipelined routing resources 732 and 734 in pipelined mode. A CAD tool (e.g., CAD tool 520 of FIG. 5) may perform a register retiming operation on circuit design 730. For example, the register retiming operation may configure pipelined routing resources 722, 724, and 726 to operate in pipelined mode and pipelined routing resources 732 and 734 in non-pipelined register mode, thereby effectively pushing registers backward across combinational gate 713 and creating integrated circuit 740.

If desired, the CAD tool may record information about the register retiming information. For example, the CAD tool may for each node (e.g., for nodes Q and S) increment a register count when a register is moved forward across the node and decrement the register count when a register is moved backward across the node, thereby recording the difference between registers pushed forward through the node and registers pushed backward through the node. In the example of integrated circuit 740, nodes Q' and S' may have a difference between forward and backward pushed registers that is equal to minus one and zero, respectively.

As an example, consider that the user wants to probe, or sample, signals at the output of logic AND gates 714 and 716. For that purpose, the CAD tool may insert taps into integrated circuit 730 (e.g., into gate-level description 610 of FIG. 6) at nodes Q and S (i.e., at the outputs of logic AND gates 714 and 716) to capture signals from those nodes. A logic analyzer (e.g., logic analyzer 619 of FIG. 6) may provide acquisition storage circuit 765 and a connection from the outputs of logic AND gates 714 and 716 to acquisition storage circuit 765. A CAD tool (e.g., tool 576 of FIG. 5) may incrementally recreate integrated circuit 740 with connections from retimed nodes Q' and S' to acquisition storage 765, which may store the probed signals for further analysis.

During debugging, a CAD tool may analyze the probed signals at nodes Q' and S' at the output of logic AND gates 714 and 716 in integrated circuit 740 based on the knowledge of nodes Q and S in circuit design 730. In this example, nodes Q and S are delayed by one clock cycle relative to each other and nodes Q' and S' are not. Thus, node S' delayed by one clock cycle may provide the same one clock cycle delay between nodes Q' and S' than between nodes Q and S.

If desired, the logic analyzer may compute an offset for the data sampled at nodes Q' and S'. The logic analyzer may compensate for the offset and re-align the data to nodes Q and S (e.g., in the waveform display pane). If desired, the logic analyzer may provide the control to switch between viewing the actually sampled data at nodes Q' and S' and the re-aligned data at nodes Q and S.

Alternatively, the logic analyzer may determine a number of registers to insert between each tap point and the acquisition storage circuit based on the recorded register retiming information. For example, the logic analyzer may for all sampled nodes determine the minimum of the difference between forward and backward pushed registers (i.e., minus one for node Q' and zero for node S') and add the absolute value of that difference (i.e., one) to the difference recorded for each sampled node (i.e., zero plus one equals one for S' and minus one plus one equals zero for Q') to determine the number of registers that need to be inserted between the respective node and the acquisition storage circuit.

In the example of integrated circuit 740, one register (e.g., register 754) needs to be inserted between node S' and acquisition storage circuit 765; and no register needs to be inserted between node Q' and acquisition storage circuit 765.

Figure 8:
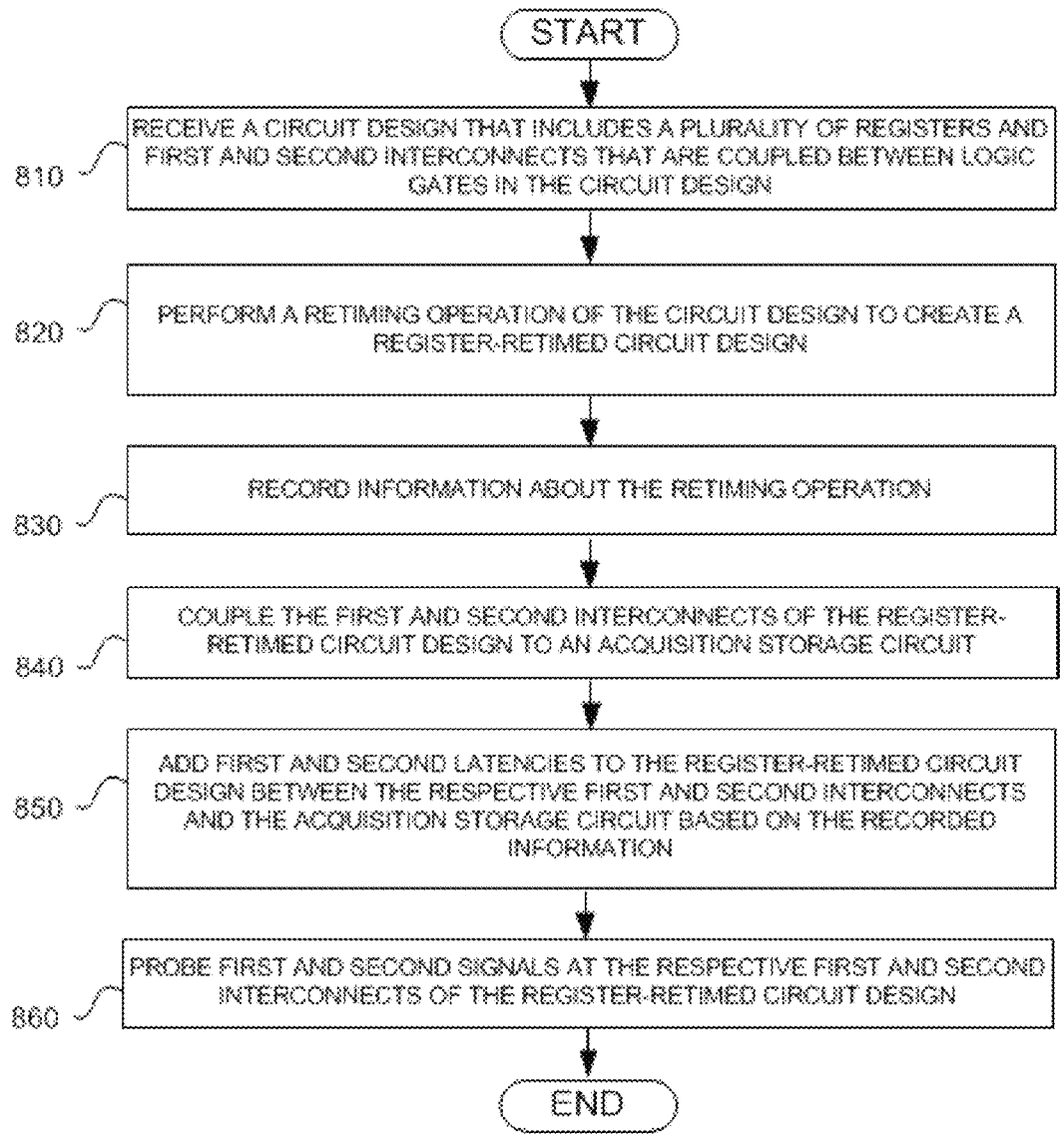
FIG. 8 is a flow chart showing illustrative steps for performing register retiming operations in an integrated circuit and probing signals in the integrated circuit after the register retiming operations in accordance with an embodiment.

FIG. 8 is a flow chart showing illustrative steps that a CAD tool (e.g., CAD tool 520 of FIG. 5) may perform to implement a circuit design in an integrated circuit and to sample signals of internal nodes from the integrated circuit for debugging the integrated circuit in real-time and at high-speed using a logic analyzer, similar to the operations that were performed on the gate-level descriptions of circuit designs 710 and 730 of FIGS. 7A and 7B, respectively.

During step 810, the CAD tool may receive a circuit design that includes a plurality of registers and first and second interconnects that are coupled between logic gates in the circuit design. For example, the CAD tool may receive circuit design 710 of FIG. 7A or circuit design 730 of FIG. 7B.

During step 820, the CAD tool may perform a retiming operation of the circuit design to create a register-retimed circuit design. As an example, the CAD tool may remove registers 722, 724, and 726 from the inputs of combinational gate 713 of FIG. 7A and add registers 732 and 734 at the outputs of the combinational gate, thereby pushing a register forward across point P. As another example, the CAD tool may remove registers 732 and 734 from the outputs of combinational gate 713 of FIG. 7B and add register 722, 724, and 726 to the inputs of the combinational gate, thereby pushing a register backward across node Q.

During step 830, the CAD tool may record information about the retiming operation. For example, the CAD tool may record information that include the move direction (e.g., forward or backward), the register type (e.g., clocking information such as clock signal name, frequency, and phase) of each register that is moved across the combinational gate.

During step 840, the CAD tool may couple the first and second interconnects of the register-retimed circuit design to an acquisition storage circuit. For example, the CAD tool may connect nodes P' and R' of integrated circuit 720 in FIG. 7A to acquisition storage circuit 760. As another example, the CAD tool may connect nodes Q' and S' of integrated circuit 740 in FIG. 7B to acquisition storage circuit 765.

During step 850, the CAD tool may add first and second latencies to the register-retimed circuit design between the respective first and second interconnects and the acquisition storage circuit based on the recorded information. For example, the CAD tool may insert one register between node P' and acquisition storage circuit 760 of FIG. 7A and zero registers between node R' and acquisition storage circuit 760. As another example, the CAD tool may insert one register between node S' and acquisition storage circuit 765 of FIG. 7B and zero registers between node Q' and acquisition storage circuit 765.

During step 860, the CAD tool may probe first and second signals at the respective first and second interconnects of the register-retimed circuit design. For example, the CAD tool may sample signals at nodes P' and R' of integrated circuit 720 of FIG. 7A. As another example, the CAD tool may sample signals at nodes Q' and S' of integrated circuit 740 of FIG. 7B.

Figure 9:
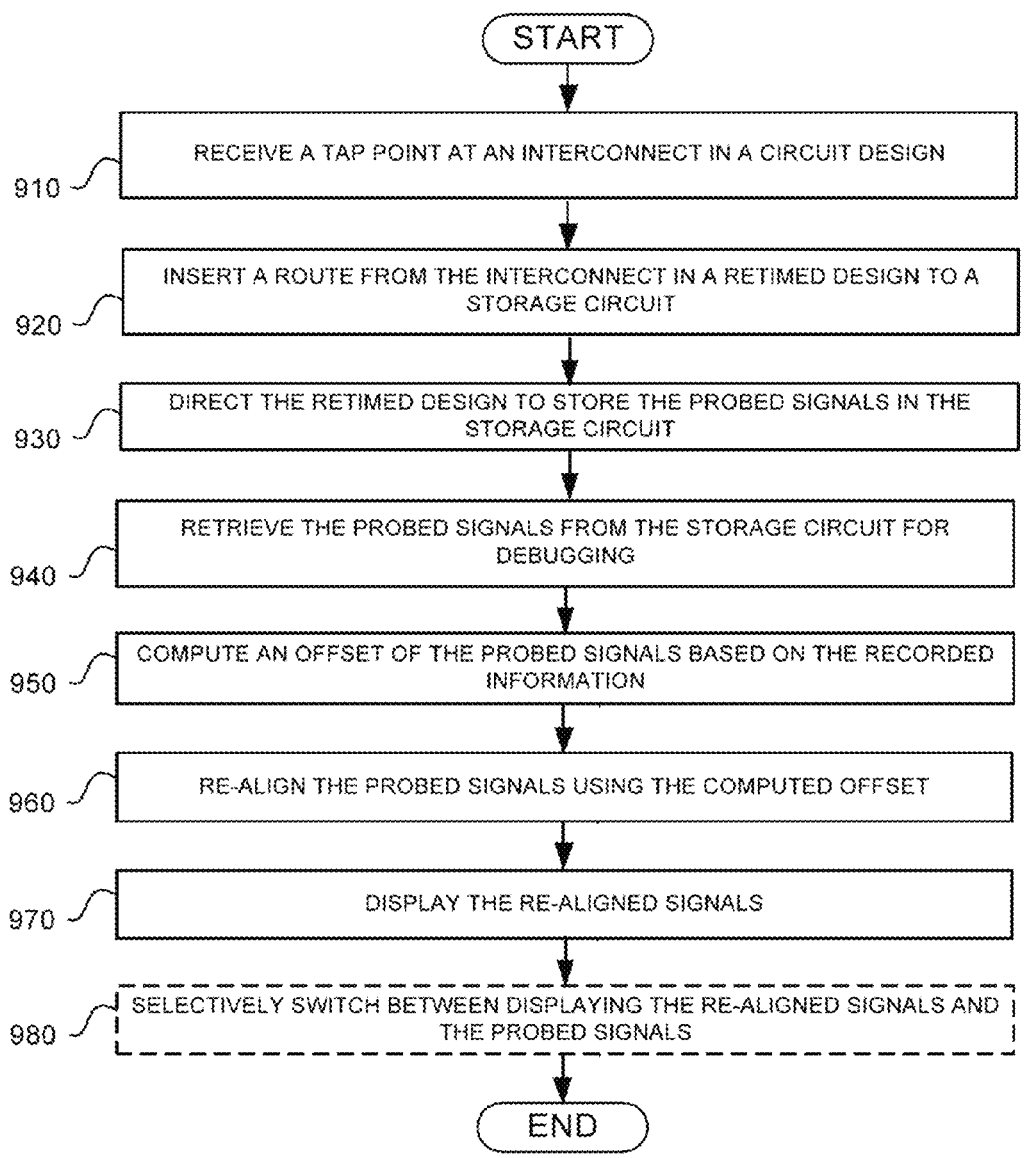
FIG. 9 is a flow chart showing illustrative steps that a logic analyzer may perform for analyzing probed signals in a retimed design in accordance with an embodiment.

FIG. 9 is a flow chart showing illustrative steps that a logic analyzer (e.g., logic analyzer 619 of FIG. 6 as part of analysis tools 578 of FIG. 5) may perform for analyzing probed signals in a retimed design. A retiming operation may have moved a register across an interconnect in a circuit design to create the retimed design. The retiming operation may also have recorded information about the register move. As an example, the retiming operation may have moved registers 724 and 726 across node P of circuit design 710 of FIG. 7A to create integrated circuit 720 as the retimed design and recorded information that one register was moved forward across node P to create node P'.

During step 910, the logic analyzer may receive a tap point at the interconnect in the circuit design. For example, the logic analyzer may receive an instruction that node P is a tap point of circuit design 710 of FIG. 7A. In response to receiving the tap point, the logic analyzer may insert a route from the interconnect in the retimed design to a storage circuit during step 920. For example, the logic analyzer may couple point P' of integrated circuit 720 of FIG. 7A to acquisition storage circuit 760.

During step 930, the logic analyzer may direct the retimed design to store the probed signals in the storage circuit 760. For example, the logic analyzer may start sampling signals at point P' of integrated circuit 720 of FIG. 7A based on a trigger condition and store the sampled signals in acquisition storage circuit 760.

During step 940, the logic analyzer may retrieve the probed signals from the storage circuit for debugging. As an example, the logic analyzer may be coupled to acquisition storage circuit 760 of FIG. 7A (e.g., through a JTAG port) and retrieve the stored signals for further processing.

During step 950, the logic analyzer may compute an offset of the probed signals based on the recorded information. As an example, the logic analyzer may compute the difference between the number of registers moved forward across node P (i.e., one register) and the number of register moved backward across node P (i.e., zero registers) during the retiming operation, thereby compensating implicitly for the additional latency that the insertion of a register between P' and the acquisition storage would have caused.

During step 960, the logic analyzer may re-align the probed signals using the computed offset. As an example, the logic analyzer may show the signals that were sampled at point P' delayed by one clock cycle. The logic analyzer may display the re-aligned signals during step 970.

If desired, the logic analyzer may provide the option to selectively switch between displaying the re-aligned signals and the probed signals. For example, the logic analyzer may offer the option to switch between showing the signals that were sampled at point P' and the signals that were sampled at point P' delayed by one clock cycle.

Figure 10:
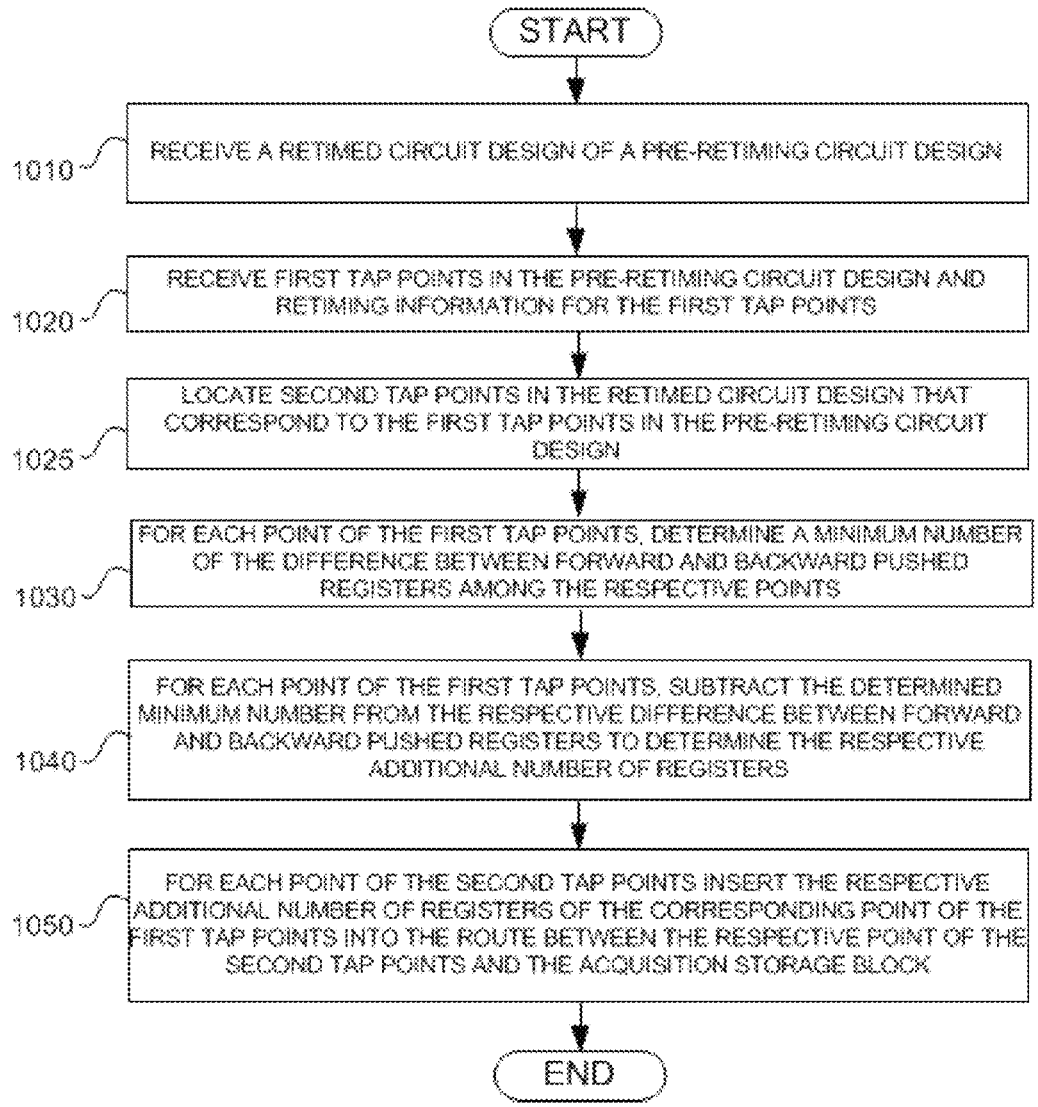
FIG. 10 is a flow chart showing illustrative steps for probing signals in a circuit in accordance with an embodiment.

FIG. 10 is a flow chart showing illustrative steps that a logic analyzer may perform for probing signals in a circuit in accordance with an embodiment.

During step 1010, the logic analyzer may receive a retimed circuit design of a pre-retiming circuit design. During step 1020, the logic analyzer may receive first tap points in the pre-retiming circuit design and retiming information for the first tap points. As an example, the logic analyzer may receive pre-retiming circuit 730 and retimed circuit 740 of FIG. 7B, information about the retiming operation that pushed a register backward across point Q, and tap points Q and S.

During step 1025, the logic analyzer may locate second tap points in the retimed circuit design that correspond to the first tap points in the pre-retiming circuit design. In the example of FIG. 7B, the logic analyzer may map tap points Q and S in the pre-retiming circuit 730 to tap points Q' and S' in the retimed circuit 740.

During step 1030, the logic analyzer may for each point of the first tap points determine a minimum number of the difference between forward and backward pushed registers among the respective points. In the example of FIG. 7B, the logic analyzer may determine the difference between forward and backward pushed registers at points Q (i.e., minus one) and S (i.e., zero) and determine the minimum of the two differences (i.e., minus one).

During step 1040, the logic analyzer may for each point of the first tap points subtract the determined minimum number from the respective difference between forward and backward pushed registers to determine the respective additional number of registers. In the example of FIG. 7B, the logic analyzer may compute zero for the additional number of registers at point Q' (i.e., (−1)−(−1)=0) and one for the additional number of registers at point S' (i.e., 0−(−1)=1).

During step 1050, the logic analyzer may for each point of the second tap points insert the respective additional number of registers of the corresponding point of the first tap points into the route between the respective point of the second tap points and the acquisition storage block. In the example of FIG. 7B, the logic analyzer may insert one register into the route between point S' and acquisition storage circuit 765.

The method and apparatus described herein may be incorporated into any suitable electronic device or system of electronic devices. For example, the method and apparatus may be incorporated into numerous types of devices such as microprocessors or other ICs. Exemplary ICs include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), digital signal processors (DSPs), graphics processing units (GPUs), just to name a few.

The integrated circuit described herein may be part of a data processing system that includes one or more of the following components; a processor; memory; I/O circuitry; and peripheral devices. The integrated circuit can be used in a wide variety of applications, such as computer networking, data networking, instrumentation, video processing, digital signal processing, or any suitable other application where the advantage of debugging a circuit design in real-time and at high-speed after a register retiming operation is desirable.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention.

What is claimed is:

1. A method for using a computer aided design tool implemented on computing equipment to probe signals, comprising:
    receiving, at the computing equipment, a circuit design that includes a plurality of registers and first and second interconnects that are coupled between logic gates in the circuit design;
    performing a retiming operation on the circuit design to create a register-retimed circuit design;
    recording information about the retiming operation;
    coupling the first and second interconnects of the register-retimed circuit design to an acquisition storage circuit;
    adding a first latency to the register-retimed circuit design between the first interconnect and the acquisition storage circuit based on the recorded information; and
    adding a second latency to the register-retimed circuit design between the second interconnect and the acquisition storage circuit based on the recorded information.

2. The method of claim 1, further comprising:
    probing a first signal at the first interconnect of the register-retimed circuit design and probing a second signal at the second interconnect of the register-retimed circuit design.

3. The method of claim 2, further comprising:
    receiving the first probed signal that has been delayed by the first latency at the acquisition storage circuit for temporary storage; and
    receiving the second probed signal that has been delayed by the second latency at the acquisition storage circuit for temporary storage.

4. The method of claim 1, wherein performing the retiming operation of the circuit design further comprises:
    moving a register in the plurality registers from a first position in the first interconnect to a second position in the first interconnect.

5. The method of claim 4, wherein moving the register further comprises:
    changing the configuration of a mode multiplexer that is coupled to the second position in the first interconnect from selecting a first input signal to selecting a second input signal, wherein the first input signal is driven by a routing multiplexer and the second input signal is driven by an interconnect register.

6. The method of claim 5, wherein moving the register further comprises:
    changing the configuration of an additional mode multiplexer that is coupled to the first position in the first interconnect from selecting a third input signal to selecting a fourth input signal, wherein the third input signal is driven by an additional interconnect register and the fourth input signal is driven by an additional routing multiplexer.

7. The method of claim 1, wherein recording information about the retiming operation further comprises:
    updating a first register count of the first interconnect based on the retiming operation; and
    updating a second register count of the second interconnect based on the retiming operation.

8. The method of claim 7, wherein updating the first register count further comprises:
    incrementing the first register count when a register of the plurality of registers is moved forward across the first interconnect.

9. The method of claim 7, wherein updating the register count further comprises:
    decrementing the first register count when a register of the plurality of registers is moved backward across the first interconnect.

10. The method of claim 7, further comprising:
    determining whether the first register count is smaller than the second register count.

11. The method of claim 10, wherein adding the first latency and adding the second latency to the register-retimed circuit design further comprise:
    inserting first additional registers into the register-retimed circuit design between the first interconnect and the acquisition storage circuit based on the recorded information; and
    inserting second additional registers into the register-retimed circuit design between the second interconnect and the acquisition storage circuit based on the recorded information.

12. The method of claim 11, wherein inserting first and second additional registers into the register-retimed circuit design between the respective first and second interconnects and the acquisition storage circuit based on the recorded information further comprises:
    in response to determining that the first register count is smaller than the second register count, subtracting the first register count from the second register count to determine a third register count; and
    inserting the third register count of second additional registers between the second interconnect and the acquisition storage circuit.

13. A non-transitory computer-readable storage medium for analyzing probed signals in a retimed design, wherein a register retiming operation moves a register across an interconnect of a circuit design to create the retimed design and records information about the register move, comprising instructions for:
    receiving a tap point at the interconnect in the circuit design;
    locating a retimed tap point in the retimed design based on the tap point in the circuit design;
    probing signals at the retimed tap point in the retimed design; and
    analyzing the probed signals by performing offset compensation based on the recorded information.

14. The non-transitory computer-readable storage medium of claim 13, wherein probing signals at the retimed tap point in the retimed design further comprises instruction for:
    inserting a route from the retimed tap point in the retimed design to a storage circuit.

15. The non-transitory computer-readable storage medium of claim 14, further comprising instruction for:

directing the retimed design to store the probed signals in the storage circuit.

16. The non-transitory computer-readable storage medium of claim 15, further comprising instruction for:
retrieving the probed signals from the storage circuit for debugging.

17. The non-transitory computer-readable storage medium of claim 13, wherein analyzing the probed signals further comprises instruction for:
computing an offset of the probed signals based on the recorded information.

18. The non-transitory computer-readable storage medium of claim 17, further comprising instruction for:
re-aligning the probed signals using the computed offset.

19. The non-transitory computer-readable storage medium of claim 18, further comprising instruction for:
displaying the re-aligned signals.

20. The non-transitory computer-readable storage medium of claim 18, further comprising instruction for:
selectively switching between displaying the re-aligned signals and the probed signals.

21. A method for using a circuit design tool implemented on computing equipment to probe signals in a pre-retiming circuit design, comprising:
with the circuit design tool implemented on the computing equipment, receiving a retimed circuit design of the pre-retiming circuit design;
with the circuit design tool implemented on the computing equipment, receiving first tap points in the pre-retiming circuit design and retiming information for the first tap points;
with the circuit design tool implemented on the computing equipment, locating second tap points in the retimed circuit design that correspond to the first tap points in the pre-retiming circuit design;
with the circuit design tool implemented on the computing equipment, generating a route in the retimed circuit design from the second tap points to an acquisition storage block based on the retiming information; and
with the circuit design tool implemented on the computing equipment, probing signals at the second tap points in the retimed circuit design.

22. The method of claim 21, further comprising:
sending the probed signals from the second tap points to the acquisition storage block; and
storing the probed signals in the acquisition storage block for further analysis.

23. The method of claim 22, wherein the retiming information includes for each point of the first tap points a respective difference in number between forward and backward pushed registers across the point, and wherein generating a route in the retimed circuit design from the second tap points to the acquisition storage block based on the retiming information further comprises:
determining a minimum number of the difference in number between forward and backward pushed registers among the respective points.

24. The method of claim 23, further comprising:
for each point of the first tap points, subtracting the determined minimum number from the respective difference in number between forward and backward pushed registers to determine a respective additional number of registers.

25. The method of claim 24, further comprising:
for each point of the second tap points, inserting the respective additional number of registers of the corresponding point of the first tap points into the route between the respective point of the second tap points and the acquisition storage block.

\* \* \* \* \*